United States Patent [19]
Stanek

[11] 3,959,052
[45] May 25, 1976

[54] WRAP AROUND HEAT SHRINKABLE ARTICLE

[75] Inventor: Mark J. Stanek, Sunnyvale, Calif.

[73] Assignee: Sigmaform Corporation, Santa Clara, Calif.

[22] Filed: Mar. 21, 1975

[21] Appl. No.: 560,329

[52] U.S. Cl. .............................. 156/86; 156/244; 156/258; 156/331; 264/230; 264/342 R; 264/DIG. 71; 428/36
[51] Int. Cl.² ..................................... B32B 31/18
[58] Field of Search ............... 156/86, 331; 428/36; 138/121 D; 264/230, 342 R, DIG. 71

[56] References Cited
UNITED STATES PATENTS

| | | | |
|---|---|---|---|
| 3,467,761 | 9/1969 | Plummer | 174/36 |
| 3,826,702 | 7/1974 | Chapman | 156/86 |

*Primary Examiner*—Edward G. Whitby

[57] ABSTRACT

An article and method for preparing wraparound closures for cables, pipes, splices, and junctions to effect repair, insulation, waterproofing and the like are described. The article is a generally rectangular sheet of a plastic material which has the property of shrinking toward its original dimensions when it is heated after having been stretched at elevated temperature and cooled while in stretched condition. The sheet has a large central section which has been hot stretched and cooled and two small end sections which have not been stretched. The wrap-around closure is made by wrapping the sheet loosely around the object to be enclosed and bringing the two end sections together so that one overlays the other, one or both of the facing surfaces of the end sections is coated with a thin layer of a lower alkyl cyanoacrylate adhesive. The end sections rapidly and strongly adhere to each other. The wrap-around sheet is then heated to a temperature in the range about 250°–375°F. and the central section of the sheet shrinks back toward its pre-stretch dimension tightly engaging the object about which it is wrapped.

2 Claims, 3 Drawing Figures

WRAP AROUND HEAT SHRINKABLE ARTICLE

BACKGROUND OF THE INVENTION

Heat shrinkable tubing has been used for a number of years to replace tape and other tedious means for protecting splices in cable and repair or pipe, etc. Commonly, the splice to be insulated or the pipe or cable to be covered is cut to permit the tube to be slipped over one segment followed by rejoining the cable or pipe, then slipping the heat shrinkable tube over the repair or splice. In many cases, however, it is not practical to slide a preformed tube over the splice or repair, it is useful to have a heat shrinkable member formed into a tube having an open longitudinal seam. Such a tube can be slipped around an existing splice or section of pipe or cable to be repaired eliminating the need to cut the cable in order to place the protective covering over it.

Heat shrinkable articles having such a tubular form have been disclosed in the literature as shown in U.S. Pat. No. 3,379,218. The method of closing the tube seam heretofore has consisted of some mechanical closure such as a metal rail, buttons, clamps, etc., to keep the two faces of the tube together during the heat shrinking process. A rigid mechanical closure has heretofore been found to be necessary because of the very high shear forces acting on the two ends which are held together during shrinking. While these mechanical closures have been successful in preventing the two edges from coming apart during heat recovery, they result in a bulky closure whose cross sectional area is much greater than wall thickness of the heat recoverable member. Therefore, during the heat shrinking or recovery process the wall of the tube becomes much hotter than the mechanical closure resulting in greater stress on the wall of the item during recovery which can lead to a split in the recovering portion. Other disadvantages of mechanical closures are the fact that sealants normally coated on the inner wall of these heat recoverable articles are not all melted to the same degree because there is a much greater heat sink in the mechanical closure area preventing the sealant under this area from reaching the same temperature as the sealant under the thinner wall section with the result that the sealant under the closure is often not melted sufficiently to form a good bond with the cable or pipe being repaired and a leak often results in this area, and the further fact that bulky mechanical closures project out from the cable or pipe being repaired and when the cable or pipe is pulled through a conduit, or along the ground, the closure can snag and prevent the cable or pipe from freely moving in the manner desired.

It is the object of the present invention to provide a chemical means of sealing two edges of a heat shrinkable or recoverable article to form a tubular member around the item on which the tubular member is to be shrunk for purposes of repairing a leak, sealing a splice or junction of two cables, etc.

It is a further object of this invention to provide a rapid method of sealing the two ends of a heat recoverable article without recourse to mechanical means for holding the ends together.

BRIEF DESCRIPTION

The invention relates to an article and a method useful in preparing wrap-around closures for cables, pipes, splices and the like to effect repair, insulation or water-proofing.

The article is a generally rectangular sheet of a plastic material which has the property of shrinking toward its original dimensions when it is heated after having been stretched at a temperature above its crystalline melting point and cooled to ambient temperature while in stretched condition. The sheet has a large central section which has been hot stretched and cooled and two small, flat, generally rectangular end sections integral with the central section and which have not been stretched. The sheet may be shaped into tubular form with the two end sections aligned and overlapping. The shaping can be done during the cooling step so that the sheet, when cooled, will retain its tubular form. Alternatively, the sheet can be rolled into tubular form and warmed to softening temperature and then set in tubular form by cooling.

The method involves forming a sheet of the kind above described, wrapping the unsealed tube around the object to be covered, bringing the two flat end sections into alignment so that one end section overlaps the other, then applying a lower alkyl cyanoacrylate adhesive to one or both of the facing surfaces of the end sections and pressing the end sections together. A strong bond is formed in a matter of seconds. After the bond has formed, the exterior of the tube is heated to a temperature in the range about 250°–375°F. which causes shrinking of the central section until a tight relationship between the central section and the object which it surrounds is effected. The size of the tube used will depend upon the dimension of the object to be sealed. The tube should fit loosely over the object to be covered, but it must not be so much larger in circumference than the object that when it has been heat shrunk to its original dimension, it still has not been brought into tight relationship with the object to be covered.

In the drawings

DETAILED DESCRIPTION OF THE INVENTION

Figure 1:
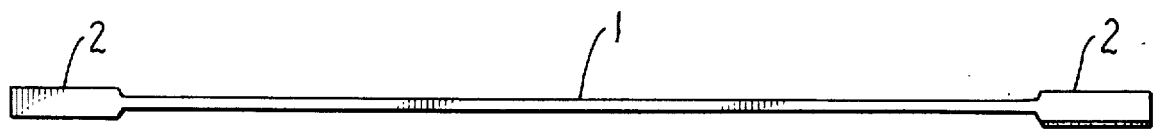
FIG. 1 is a cross-section of the heat shrinkable plastic sheet.
Figure 2:
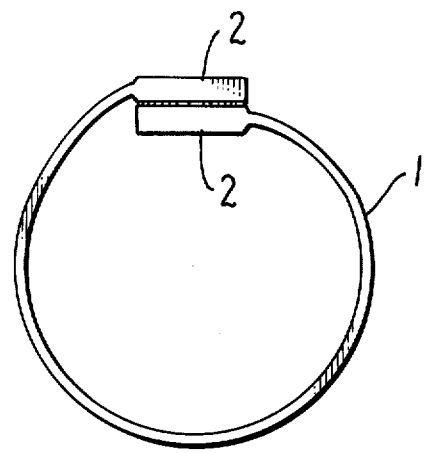
FIG. 2 is a cross-section of the plastic sheet rolled into tubular form and before heat shrinking.

FIG. 1 of the drawings shows a cross-section of a sheet formed from a plastic material which has the property of shrinking toward its original dimensions when it is heated after having been stretched at a temperature above its crystalline melting point and cooled to ambient temperature while in stretched condition. Central section 1 is relatively thin and has been stretched up to about four times its original length while at a temperature above the melting range of the crystalline portion of the plastic and then cooled to a temperature below the crystalline melting point while in stretched condition. End sections 2 are integral with central section 1 but either have not been hot stretched or have been stretched and then heated to shrink them to approximately pre-stretched width. FIG. 2 shows the sheet illustrated in FIG. 1 which has been rolled into the shape of an unclosed tube with two end sections aligned with each other and overlapping each other.

Figure 3:
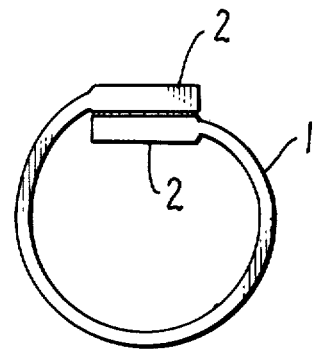
FIG. 3 is a cross-section of the tubular sheet shown in FIG. 2 after heat shrinking.

FIG. 3 shows the tubular section of FIG. 2 after the tube has been heated to a temperature in the range of about 250°–375°F to cause shrinkage of central section 1 toward its original dimension.

The plastic sheet shown in FIG. 2 can be prepared by molding or extruding a flat sheet of a polyvinyl plastic material which is then cross-linked either by chemical means or by radiation. The molded or extruded sheet is then heated above the melting point of the crystalline portion of the cross-linked plastic material and while at elevated temperature, the two opposite end edges of the sheet are clamped and the material between the clamped edges is stretched and cooled below the crystalline melting point of the material while it is still in expanded condition. The resulting sheet has a central section which is heat shrinkable or heat recoverable and two end edges which, not having been stretched, do not shrink when heated. When it is desired to put the sheet into the tubular form illustrated in FIG. 2, the sheet is shaped into tubular form after hot stretching and before the central section has been cooled to ambient temperature. In order to insure that the two flat end sections do not become involved in the stretching process, it may be desirable to cool the clamps which hold these end sections during the hot stretching process.

A tube generally similar to that shown in FIG. 2 can also be prepared by extruding a plastic tube, hot stretching the tube until its circumference is about one and a half to four times the circumference of the original tube, slitting the tube from end to end so that it could be opened to form a rectangular sheet and then heating a narrow section of the plastic on each side of the slit to shrink these narrow section to pre-stretch dimensions. The result is a tube corresponding in cross-section to FIG. 2 in which the narrow sections which have been shrunk to pre-stretch dimension constitute the tabs or end sections 2 which are not heat shrinkable.

The plastic material from which the sheet shown in FIG. 1 or the tube shown in FIG. 2 can be formed can be any plastic material having the property of being stretchable to about 2 to 4 times its original dimension when heated above the melting points of its crystalline portion and then, if it is cooled while in stretched condition, having the property of returning toward its original dimension when heated to about 250°–375°F.

The preferred plastic materials are cross-linked vinyl polymers such as high density polyethylene, low density polyethylene, ethylene-vinyl acetate copolymers, ethylene-alkyl acrylate copolymers, chlorinated polyethylene, chlorosulfonated polyethylene, ethylene-propylene copolymers or mixtures of polyethylene with any of the modified polyethylenes. The cross-linking can be accomplished either by chemical treatment with peroxides such as dicumyl peroxide, 2,5 bis(t-butyl peroxy)-2,5 dimethyl hexane, αα'-bis(t-butyl peroxy) di-isopropyl benzene and the like or by subjecting the polymers to intense radiation. The cross-linking may also be accomplished, if desired, by hydrolytic means as used in cross-linking silylated polyethylene, i.e., polyethylene on which siloxane groups have been grafted.

Adhesives which are quick setting and have sufficient bonding power to hold end sections 2 of FIG. 2 together against the most severe strains that occur during the heat shrinking process are the lower alkyl-α-cyanoacrylate adhesives. The general formula for the α-alkyl cyanoacrylates is

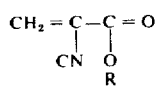

in which R is a $C_1$ to $C_4$ alkyl group, preferably methyl or ethyl. These adhesives set within a few seconds to produce bonds of enormous strength between tabs of unstretched cross-linked vinyl polymers and are markedly superior to any other available adhesives.

It has been found that the bond strength between cyanoacrylate adhesives and the plastic material is much greater if the plastic is a cross-linked vinyl material rather than an uncrosslinked material. Further, bond strength is increased by dispersing 5 to 10% by weight of an inorganic filler such as carbon black or finely divided clay in the plastic material from which the rectangular sheets are formed.

The practice of the invention is illustrated in the following examples:

EXAMPLE 1

Ethylene-vinyl acetate copolymer containing approximately 10% vinyl acetate compounded with carbon black, antioxidants and a curing catalyst (2% dicumyl peroxide) is pelletized and molded into a slab having the dimensions 6 × 6 × 0.075 inch. The slab is cured at 320° for 5 minutes and removed from the mold. The resulting cross-linked polyolefin is heated to approximately 300°F. which is above the crystalline melting point of the polyolefin portion, and two opposite edges are clamped 0.75 inch in from the edge and the remaining 4.5 inch central section is stretched to a length of 10.0 inches and cooled while in the expanded condition. The resulting expanded sheet having two end sections in the original as-molded condition is then formed into a tube around a 2 inch mandrel or cable, and one overlapping end section is coated with a thin layer of ethyl —α— cyanoacrylate adhesive and the other edge is pressed against the adhesive end section. A thin line of adhesive is then placed along the mating edges. The bond is almost instantaneous and within 2 seconds the two overlapping end sections no longer require any fixturing. After allowing the bond to remain at ambient temperature for approximately 2 minutes, a gas fired propane torch is applied uniformly on the entire surface of the wrap-around tube including the overlapped sections until the tube has completely recovered on the mandrel. A hot melt sealant is often coated on the inside surface of the tube in which case sufficient heat is applied to the tube and overlapping edges to completely melt the sealant so that it is forced out at the two ends of the tube as the tube shrinks.

EXAMPLE 2

The experiment described in Example 1 was repeated, except that methyl -α-cyanoacrylate adhesive was used instead of ethyl -α-cyanoacrylate adhesive. Again, the tube, including the bonding edges, could be heated sufficiently to bring about complete recovery without breaking the bond at the overlapped sections.

EXAMPLE 3

The experiment described in Example 1 was repeated using this time low density polyethylene having density of 0.918 and melt index of 1.8 compounded with carbon black, anti oxidants and 2% dicumyl peroxide as the cross-linking catalyst.

EXAMPLE 4

A mixture containing 50 parts low density polyethylene having density of 0.918 and 50 parts chlorosulfonated polyethylene (36% chlorine) was compounded with carbon black, stabilizers and catalyst (1.5% (2,5 bis (t-butyl peroxy)2,5dimethyl hexane on an inert carrier). A slab molded from this material and cured at 330°F. for 4 minutes was expanded by method used in Example 1. Bonding of the wrap-around sleeve was accomplished using ethyl -α-cyanoacrylate adhesive as described in Example 1. The sleeve was successfully recovered without breaking the adhesive bond.

The importance of having two end sections which have not been hot stretched integral with the central hot stretched section can be readily appreciated if it is attempted to use a hot stretched sheet which has no such end sections. The adhesive is applied to the overlapping ends of the completely stretched sheet and allowed to set but when the tube is then heated to cause heat shrinking, not only does the central section of the tube shrink but also the end section which are held together by the adhesive shrink, and this shrinking weakens or breaks the adhesive bond between the two ends. Sheets of the kind illustrated in FIG. 1 may be produced in various sizes. As the length of the sheet is increased, the width of the unstretched end sections is also increased to insure secure bonding. In general, each end section will have a width which is equal to about 2 to 15% of the length of the central section.

The total length of the sheets illustrated in FIG. 1 or the circumference of the tubular article shown in FIG. 2 will be varied dependent upon dimensions of the article to be enclosed being ordinarily 1.5 to 2.5 times the circumference of the article.

The shrinking temperature required, if shrinking is to be accomplished in reasonable time, should exceed 200°F. but should be kept below about 375°F. because at this temperature and above the lower alkyl cyanoacrylate adhesives tend to soften and weaken.

The surface of the sheet shown in FIG. 1 or the interior of the tubular article shown in FIG. 2 are commonly coated with a sealant material adapted to bring the heat shrunk plastic into close and continuous engagement with the article to be covered. Suitable sealants are well-known in the art and include materials such as vinyl acetate polymer, wax, polyisobutenes and the like.

What is claimed is:

1. The method of covering an object with a wrap-around closure which comprises preparing a generally rectangular sheet of a cross-linked vinyl polymer which has the property of shrinking to its original dimensions when it is heated after having been stretched at a temperature above its crystalline melting point and then cooled to a temperature below the crystalline melting point, clamping both ends of the sheet with clamping means covering relatively narrow, generally rectangular end sections, heating the central section to a temperature above the crystalline melting point of the polymer, stretching the heated central section such that its stretched length is substantially greater than its pre-stretched length, cooling the central section to a temperature below the crystalline melting point while in stretched condition, shaping the sheet into tubular form with two end sections aligned and overlapping, placing the tubular sheet around the object to be closed, applying a lower alkyl cyanoacrylate adhesive to one or both of the facing surfaces of the end sections and pressing the end sections together and then heating the central section to a temperature in the range 250°–375°F. to shrink the central section into tight relationship with the object to be closed.

2. The method of covering an object with a wrap-around closure which comprises extruding a cross-linked vinyl polymer which has the property of shrinking to its original dimensions when it is heated after having been stretched at a temperature above its crystalline melting point and then cooled to a temperature below the crystalline melting point to form a generally cylindrical tube, heating the tube to a temperature above the crystalline melting point of the polymer and expanding the heated tube to a diameter greater than its original diameter, cooling the expanded tube to a temperature below the crystalline melting point, slitting the tube along its full length, heating a narrow, generally rectangular portion of the tube adjacent both sides of the slit to a temperature in range 250° to 375°F. to shrink the rectangular portions to approximately their pre-expansion widths, placing the slitted tube around the object to be closed so that said two narrow rectangular portions are aligned and overlapping, applying a lower alkyl cyanoacrylate adhesive to one or both of the facing surfaces of said rectangular portions, pressing the rectangular portions together and then heating the tube to a temperature in the range 250° to 375°F. to shrink it into tight relationship with the object to be closed.

* * * * *